United States Patent
Stoll

(10) Patent No.: US 11,137,484 B1
(45) Date of Patent: Oct. 5, 2021

(54) SYSTEMS AND METHODS TO CALIBRATE TRACKING SYSTEMS

(71) Applicant: Valve Corporation, Bellevue, WA (US)

(72) Inventor: Gordon Wayne Stoll, Sammamish, WA (US)

(73) Assignee: Valve Corporation, Bellevue, WA (US)

( * ) Notice: Subject to any disclaimer, the term of this patent is extended or adjusted under 35 U.S.C. 154(b) by 445 days.

(21) Appl. No.: 15/906,646

(22) Filed: Feb. 27, 2018

(51) Int. Cl.
*G01S 17/66* (2006.01)
*G01S 7/497* (2006.01)

(52) U.S. Cl.
CPC .............. *G01S 7/497* (2013.01); *G01S 17/66* (2013.01)

(58) Field of Classification Search
CPC ................... G01S 7/497; G01S 17/66
See application file for complete search history.

(56) References Cited

U.S. PATENT DOCUMENTS

| | | | | |
|---|---|---|---|---|
| 2008/0117294 A1* | 5/2008 | McCutchen | ..... | G08B 13/19641 348/143 |
| 2010/0239121 A1* | 9/2010 | Meier | ....... | G06T 7/75 382/103 |
| 2017/0160821 A1* | 6/2017 | Kuehne | ........ | G06F 3/011 |
| 2017/0324942 A1* | 11/2017 | Tocher | ........ | H04N 13/271 |

\* cited by examiner

*Primary Examiner* — David P Porta
*Assistant Examiner* — Shun Lee
(74) *Attorney, Agent, or Firm* — Seed IP Law Group LLP

(57) ABSTRACT

A calibration system for calibrating tracking equipment includes a segmented dish formed from a plurality of individual panels, a support frame formed from a plurality of individual structural shafts to support the segmented dish, and a rotatable platform to hold the tracking equipment to be calibrated. The segmented dish includes a plurality of sensor assemblies rotatably coupled to its individual panels and a plurality of motor assemblies to control operation of the sensor assemblies.

23 Claims, 11 Drawing Sheets

SYSTEMS AND METHODS TO CALIBRATE TRACKING SYSTEMS

BACKGROUND

Technical Field

The present disclosure generally relates to calibration systems, and more particularly, to systems and methods for calibration of tracking systems.

Description of the Related Art

Demand for tracking systems with heightened performance is increasing, including with the growth of electronic virtual reality and augmented reality systems and other electronic devices. Virtual reality systems typically envelop a wearer's eyes completely and substitute a "virtual" reality for the actual view (or actual reality) in front of the wearer, while augmented reality systems typically provide a semi-transparent or transparent overlay of one or more screens in front of a wearer's eyes such that actual view is augmented with additional information. In many virtual reality and augmented reality systems, the movement of a wearer of such a head mounted display may be tracked in various manners, such as via sensors in the head mounted display and/or external to the head mounted display, in order to enable the images being shown to reflect user movements.

BRIEF SUMMARY

Calibration of precise tracking systems such as optical tracking systems or acoustic tracking systems can be challenging, at least because tolerances on calibration equipment are often greater than the expected errors in the tracking systems. A less-precise tracking system can be calibrated by comparing its results to results of a more-precise tracking system, but this leaves the challenge of calibrating the more precise tracking system.

Applicant has discovered that it is possible to move objects carrying optical, acoustic, or other emitters or detectors in a circle with extreme precision, which can provide a "ground truth" condition useful for calibrating tracking systems. For example, with the knowledge that a calibration object such as an optical or acoustic emitter or detector has moved in a perfect circle while measurements are obtained, errors in a manufactured tracking system, such as those that result from manufacturing imperfections, can be accurately measured and then adjusted for, providing a measure of the precision or accuracy of the tracking system and ultimately improving the performance of the tracking system.

A calibration system may be summarized as comprising: a stationary support element; and a sensor assembly rotatably coupled to the stationary support element, the sensor assembly includes at least one photodetector constrained to rotate about an axis of rotation of the sensor assembly. The sensor assembly may include a dome-shaped outer surface and each of the photodetectors may be positioned within the dome-shaped outer surface of the sensor assembly. The at least one photodetector may include a plurality of photodetectors.

Each of the photodetectors may be arranged on the sensor assembly such that no two of the photodetectors are aligned with one another along a radial axis extending radially outward from the axis of rotation. Each of the photodetectors may be arranged on the sensor assembly such that the photodetectors are radially spaced apart from one another with respect to the axis of rotation. Each of the photodetectors may be arranged on the sensor assembly such that the photodetectors are uniformly radially spaced apart from one another with respect to the axis of rotation. Each of the photodetectors may be arranged on the sensor assembly such that no two of the photodetectors sweep out circular paths within a single geometric plane. Each of the photodetectors may be arranged on the sensor assembly such that a clear line of sight exists from a location of an optical system to be calibrated by the calibration system to each of the photodetectors along an entirety of a path of each of the photodetectors.

A calibration system may be summarized as comprising: a stationary support structure; and a plurality of sensor assemblies including a first sensor assembly rotatably coupled to the support structure and a second sensor assembly rotatably coupled to the support structure, the first sensor assembly includes a first plurality of photodetectors constrained to rotate about a first axis of rotation of the first sensor assembly, the second sensor assembly includes a second plurality of photodetectors constrained to rotate about a second axis of rotation of the second sensor assembly.

The support structure may include: a first panel located at a center of a segmented dish and having a hexagonal shape including a first edge, a second edge, a third edge, a fourth edge, a fifth edge, and a sixth edge; a second panel having a trapezoidal shape including a smaller base coupled to the first edge of the first panel; a third panel having a trapezoidal shape including a smaller base coupled to the second edge of the first panel and a first leg coupled to a first leg of the second panel; a fourth panel having a trapezoidal shape including a smaller base coupled to the third edge of the first panel and a first leg coupled to a second leg of the third panel; a fifth panel having a trapezoidal shape including a smaller base coupled to the fourth edge of the first panel and a first leg coupled to a second leg of the fourth panel; a sixth panel having a trapezoidal shape including a smaller base coupled to the fifth edge of the first panel and a first leg coupled to a second leg of the fifth panel; and a seventh panel having a trapezoidal shape including a smaller base coupled to the sixth edge of the first panel, a first leg coupled to a second leg of the sixth panel, and a second leg coupled to a second leg of the second panel.

The plurality of sensor assemblies may include two sensor assemblies rotatably coupled to each of a plurality of the panels of the support structure. Each of the two sensor assemblies rotatably coupled to each of the plurality of panels may include twenty photodetectors constrained to rotate about an axis of rotation of the respective sensor assembly. The calibration system may further comprise: a first motor assembly coupled to the first sensor assembly to actuate the first sensor assembly to rotate about the first axis of rotation; and a second motor assembly coupled to the second sensor assembly to actuate the second sensor assembly to rotate about the second axis of rotation.

A method of calibrating an optical system may be summarized as comprising: moving a first photodetector coupled to a stationary support element along at least a portion of a first circular path; moving a second photodetector coupled to the stationary support element along at least a portion of a second circular path; generating light at the optical system; recording measurements of the generated light taken by the first and second photodetectors; and using the recorded measurements to calculate at least one calibration factor for the optical system.

Using the recorded measurements may include providing the recorded measurements and a specified geometry of the optical system to a non-linear solver. Using the recorded measurements may include providing the recorded measurements and a specified pattern of the generated light to a non-linear solver. Using the recorded measurements may include providing the recorded measurements and a constraint that the photodetectors moved along circular paths to a non-linear solver. The at least one calibration factor may be representative of a deviation of the actual geometry of the optical system from a specified geometry of the optical system.

A method of calibrating an optical system may be summarized as comprising: positioning the optical system at a focal point of a segmented dish formed of a plurality of panels; moving a first photodetector coupled to a first one of the panels along at least a portion of a first circular path; moving a second photodetector coupled to a second one of the panels along at least a portion of a second circular path; generating light at the optical system; recording measurements of the generated light taken by the first and second photodetectors; and using the recorded measurements to calculate at least one calibration factor for the optical system.

The method may further comprise: using the optical system in a virtual reality system; communicating the at least one calibration factor to a component of the virtual reality system; and using the calibration factor to correct measurements of the location of the component. The component may be a headset or a controller.

A calibration system may be summarized as comprising: a stationary support element; and a first light assembly rotatably coupled to the stationary support element, the first light assembly includes at least one light-emitting device constrained to rotate about an axis of rotation of the first light assembly.

The first light assembly may include a plurality of light-emitting devices. The calibration system may further comprise: a second light assembly rotatably coupled to the stationary support element, the second light assembly includes at least one light-emitting device constrained to rotate about an axis of rotation of the second light assembly. The at least one light-emitting device may include at least one light emitting diode.

A calibration system to calibrate a tracking system that includes one of an emitter or a detector may comprise: a stationary support element; and a calibration assembly rotatably coupled to the stationary support element, the calibration assembly includes at least one of the other of an emitter or a detector constrained to rotate about an axis of rotation of the calibration assembly.

The tracking system may include an optical emitter and the calibration assembly may include an optical detector. The tracking system may include an optical detector and the calibration assembly may include an optical emitter. The tracking system may include an acoustic emitter and the calibration assembly may include an acoustic detector. The tracking system may include an acoustic detector and the calibration assembly may include an acoustic emitter.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with the technology have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not limit the scope or meaning of the implementations.

Figure 1:
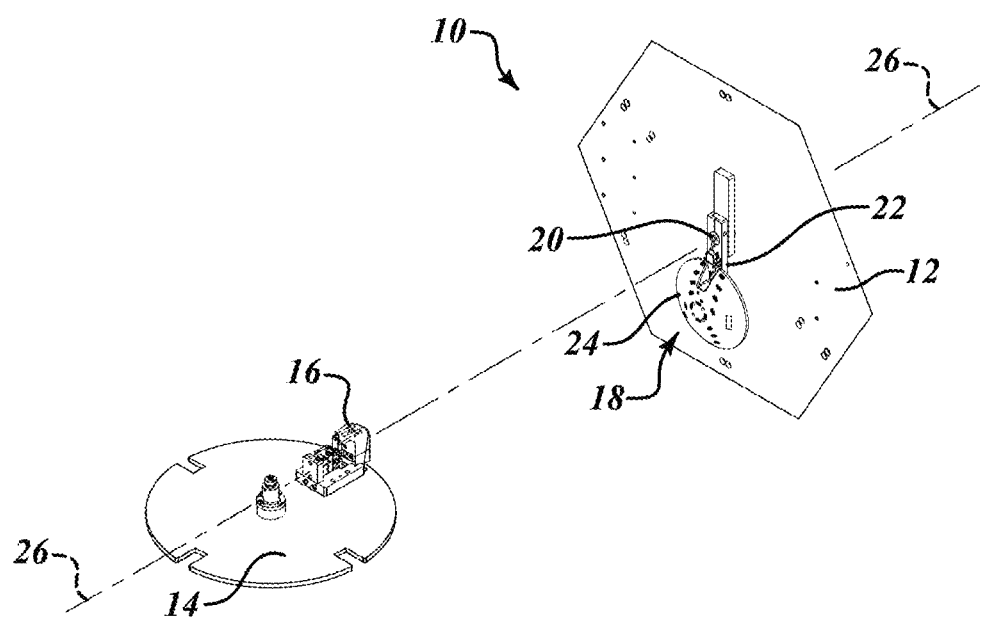
FIG. 1 is a front, top, right-side perspective view of a calibration system, according to at least one illustrated implementation.

FIG. 1 shows a calibration system 10 for calibrating optical tracking systems. While the calibration system 10 is described as being used to calibrate optical tracking systems, the same features and principles can be used to calibrate any tracking system, including acoustic tracking systems. In the illustrated implementation, the calibration system 10 includes a stationary support element or panel 12 and a support or platform 14 positioned to support an optical system 16 to be calibrated by the calibration system 10. While the stationary support element is described as being a panel 12 and the support is described as being a platform 14, any suitable features, such as one or more mechanical arms, can be used as the stationary support element and support in place of the panel 12 and platform 14.

The panel 12 is arranged and oriented with a first major surface thereof facing forward toward the platform 14, and is positioned within a field of view of the optical system 16. The panel 12 includes a sensor assembly 18 rotatably coupled to a central portion of its first major surface. The sensor assembly 18 includes a central hub 20, which is rotatably mounted to the panel 12, and which rotatably couples the rest of the sensor assembly 18 to the panel 12.

The sensor assembly 18 also includes an arm 22 that extends radially outward from the central hub 20 and a head portion 24 that extends forward from the arm 22. The head portion 24 includes one or more photodetectors facing forward from the outer surface of the head portion 24. When the sensor assembly 18 is actuated to rotate about its axis of rotation 26 at the center of its central hub 20, its head portion 24, and each of the one or more photodetectors, travel in a circular path (as used herein, the term "circular path" can refer to either at least a portion of a circle or at least an entirety of a circle) about the axis of rotation 26. In at least some implementations, the optical system 16 is designed and configured to emit light, such as infrared light, according to a predetermined pattern, including various pulses and sweeps of the infrared light across its field of view.

A method of using the calibration system 10 to calibrate the optical system 16 includes controlling the sensor assembly 18 to rotate about its axis of rotation 26, controlling the optical system 16 to emit light according to the predetermined pattern, and measuring the light emitted by the optical system 16 and received by each of the one or more photodetectors of the sensor assembly 18 as it rotates about its axis of rotation 26. Once these measurements have been taken and recorded, they are fed into or provided to a non-linear solver, along with the specified geometry of the optical system 16, the predetermined pattern for the emitted light, and a constraint that each of the individual photodetectors of the sensor assembly 18 moved along a perfect circular path in three-dimensional space.

Using such input information, the non-linear solver then computes and outputs numerical values representative of errors in the actual geometry of the optical system 16 or the deviation of the actual geometry of the optical system 16 from its specified geometry. The numerical values are then stored or used as correction or calibration factors within the optical system 16.

Due to the relatively tight tolerances in commercially available rotational bearings, it is relatively straightforward, using off-the-shelf components, to fabricate the calibration system 10 so that the circular path of the photodetectors of the sensor assembly 18 is highly precise. Specifically, in at least some implementations the calibration system 10 is fabricated so that the circular path of the photodetectors of the sensor assembly 18 is sufficiently precise to detect deviations in the light emitted by the optical system 16 from the predetermined pattern to within an accuracy of, or better than, 0.1 mm at a distance of one meter away from the optical system 16, for example.

FIGS. 2-6 show an example calibration system 100 for calibrating optical tracking systems. As discussed further below, the calibration system 100 may be used to rapidly measure the performance of and/or calibrate an optical tracking system across a large portion of the field of view of the tracking system. Although the particular features of the calibration system 100 are discussed below, it should be appreciated that other modifications and variations may be implemented that are within the scope of the present disclosure. In the illustrated implementation, the calibration system 100 includes a segmented dish 102 having an overall shape comprising seven individual planar segments or panels 104. The calibration system 100 also includes a support frame 106 having a plurality of structural bars or shafts 108 that form a rigid network of shafts 108 arranged to support and hold the segmented dish 102 in place. The calibration system 100 also includes a rotatable platform 110 having a circular overall shape and positioned to support one or more optical systems 112 to be calibrated by the calibration system 100.

As used herein, words such as "front," "forward," and other similar terminology refer to a feature being located in the direction of the rotatable platform 110 along an axis extending through the centers of the segmented dish 102 and the rotatable platform 110, while words such as "back," "rearward," "behind," and other similar terminology refer to a feature being located in the direction of the segmented dish 102 along such an axis. As used herein, terms such as "right" and "left" refer to locations as viewed in a direction from the rotatable platform 110 toward the segmented dish 102 along such an axis. As used herein, terms of relative elevation, such as "top," "bottom," "upper," "lower," "above," "below," "up," and "down," are used in their ordinary sense, that is, with respect to a direction of a gravitational force, such that liquids are drawn by gravity to flow from a first location toward a second location below the first location.

As illustrated in FIGS. 2-6, the support frame 106 includes four adjustable feet 114, including a first adjustable foot 114a at a front, left corner of the frame 106, a second adjustable foot 114b at a front, right corner of the frame 106, a third adjustable foot 114c at a rear, left corner of the frame 106, and a fourth adjustable foot 114d at a rear, right corner of the frame 106. Each of the feet 114 has a bottom surface that rests on a floor or other ground surface, and can be screwed or threaded upwards into or downwards out of one of the shafts 108 of the frame 106, to allow an operator to level the frame 106 on the ground surface. The feet 114 raise the rest of the frame 106 off the ground surface and keep the rest of the frame 106, including the rigid network of shafts 108, separated from the ground surface.

Figure 4:
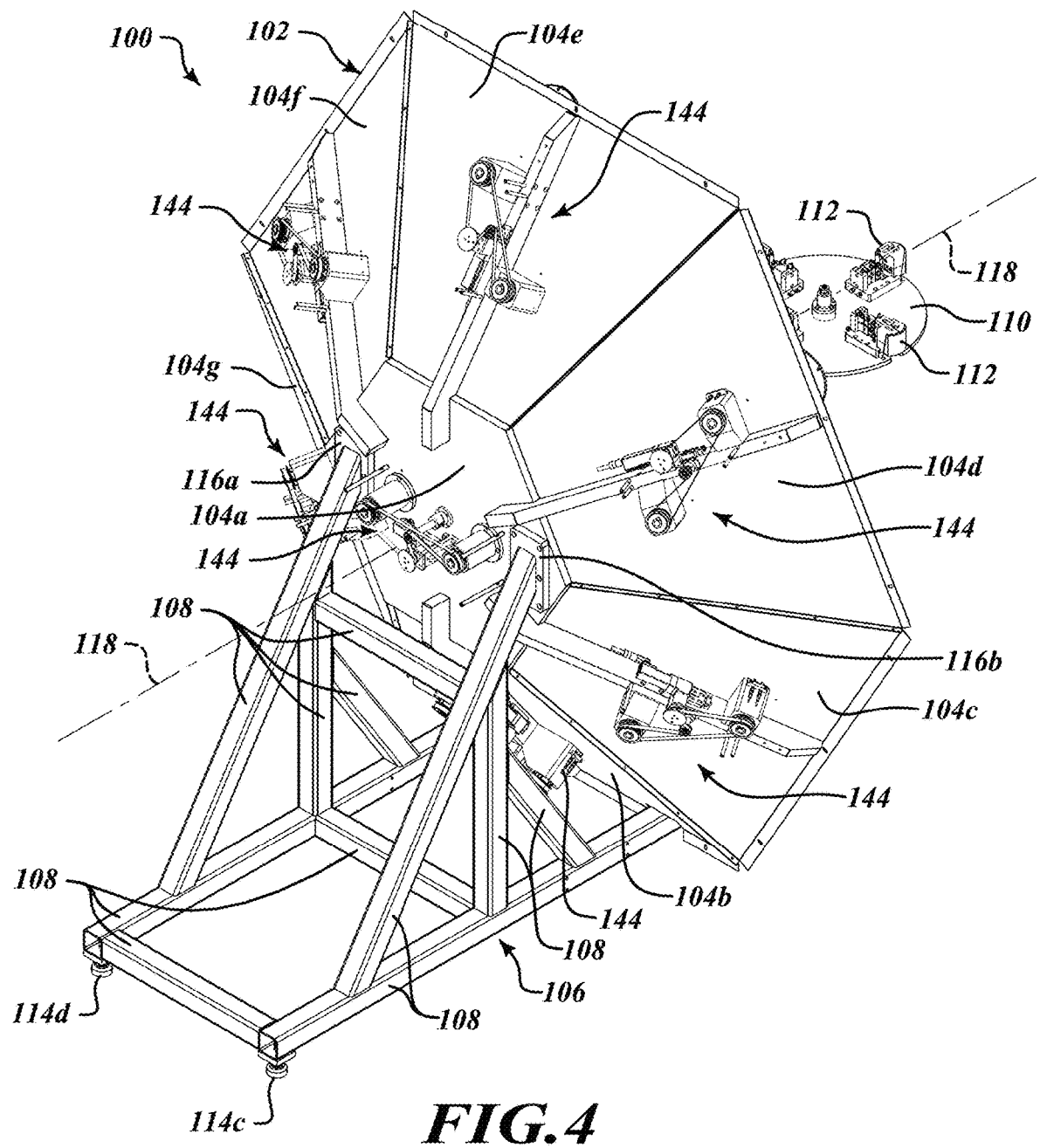
FIG. 4 is a rear, top, left-side perspective view of the calibration system FIGS. 2 and 3, according to at least one illustrated implementation.
Figure 5:
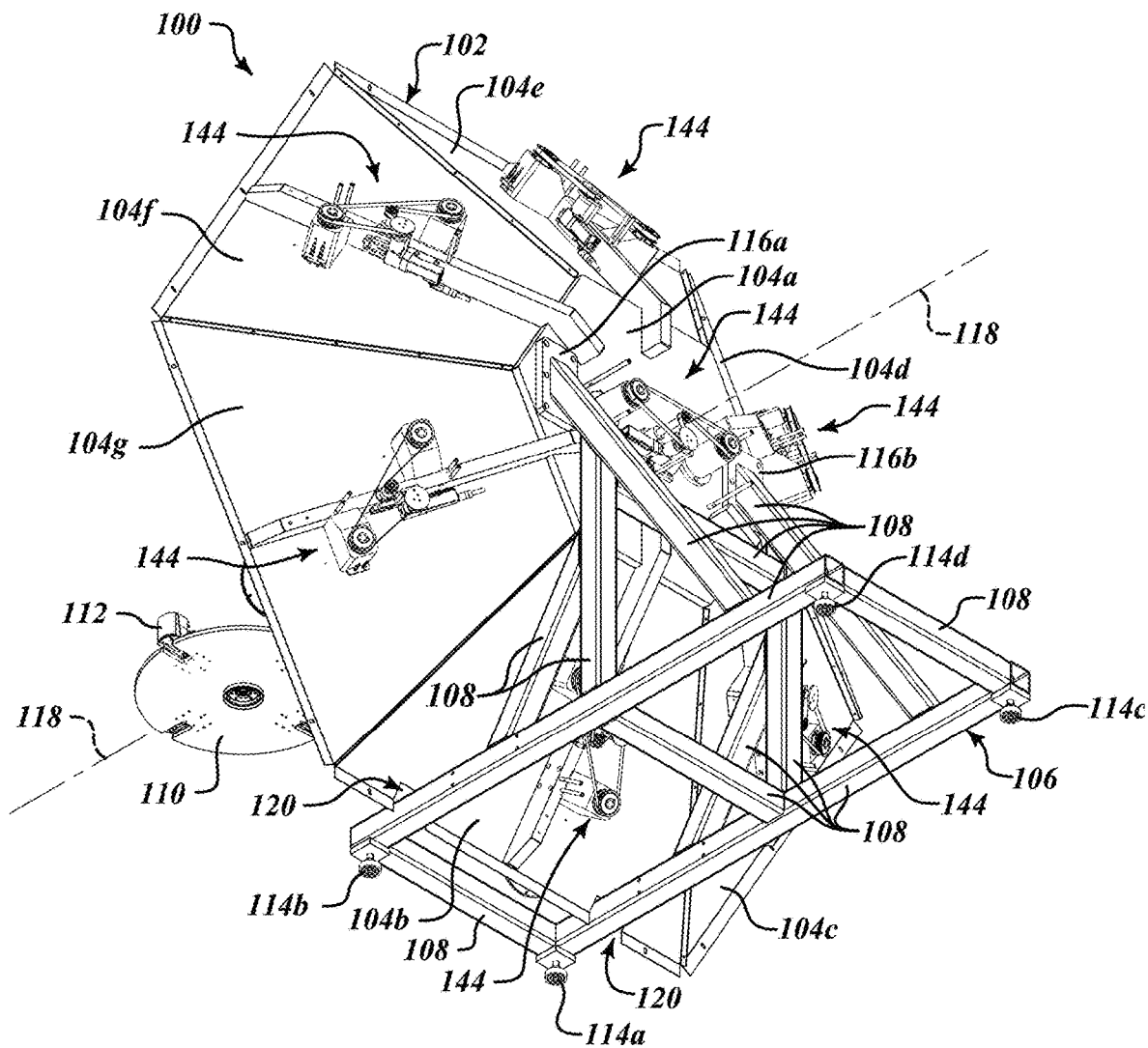
FIG. 5 is a rear, bottom, right-side perspective view of the calibration system of FIGS. 2-4, according to at least one illustrated implementation.

As illustrated in FIGS. 4 and 5, the support frame 106 also includes a pair of mounting plates 116a and 116b (collectively, mounting plates 116) held rigidly by respective shafts 108 of the support frame 106. The mounting plates 116 are rigidly mounted to the segmented dish 102, such as by a plurality of (e.g., six) bolts, to rigidly support the dish 102 in a stationary, upright orientation. The segmented dish 102 is held in place only by the mounting plates 116 of the support frame 106, and is not physically or structurally connected to any other components except for wires that connect electronic components of the dish 102 to source(s) of electric power and/or other electronic devices, as described further below.

As illustrated in FIGS. 2-6, the segmented dish 102 has seven individual planar segments or panels 104, including a first, central panel 104a having an overall hexagonal shape with a lower edge, a lower-left edge, an upper-left edge, an upper edge, an upper-right edge, and a lower-right edge. The panels 104 also include a second, lower panel 104b coupled to the lower edge of the first panel 104a, a third, lower-left panel 104c coupled to the lower-left edge of the first panel 104a, a fourth, upper-left panel 104d coupled to the upper-left edge of the first panel 104a, a fifth, upper panel 104e coupled to the upper edge of the first panel 104a, a sixth, upper-right panel 104f coupled to the upper-right edge of the first panel 104a, and a seventh, lower-right panel 104g coupled to the lower-right edge of the first panel 104a.

Each of the second, third, fourth, fifth, sixth, and seventh panels 104b-104g has an overall trapezoidal, and specifically a convex isosceles trapezoidal, shape, with the shapes of each of the second, third, fourth, fifth, sixth, and seventh panels 104b-104g being the same as one another. Each of the panels 104b-104g is coupled to the first panel 104a at its respective smaller base side of its trapezoidal shape. Further, each of the panels 104b-104g is coupled to another one of the panels 104b-104g at a first leg of its trapezoidal shape and to another one of the panels 104b-104g at a second leg of its trapezoidal shape.

In particular, the second panel 104b is coupled at the legs of its trapezoidal shape to respective legs of the trapezoidal shapes of the third panel 104c and the seventh panel 104g. The third panel 104c is coupled at the legs of its trapezoidal shape to respective legs of the trapezoidal shapes of the fourth panel 104d and the second panel 104b. The fourth panel 104d is coupled at the legs of its trapezoidal shape to respective legs of the trapezoidal shapes of the fifth panel 104e and the third panel 104c. The fifth panel 104e is coupled at the legs of its trapezoidal shape to respective legs of the trapezoidal shapes of the sixth panel 104f and the fourth panel 104d. The sixth panel 104f is coupled at the legs of its trapezoidal shape to respective legs of the trapezoidal shapes of the seventh panel 104g and the fifth panel 104e. The seventh panel 104g is coupled at the legs of its trapezoidal shape to respective legs of the trapezoidal shapes of the second panel 104b and the sixth panel 104f.

The first panel 104a is held by the support frame 106 so that it is arranged and oriented vertically, with a first major surface thereof spanning between its six outer edges facing forward toward the rotatable platform 110. In particular, a longitudinal axis 118 extending through and perpendicular to the center of the first major surface of the first panel 104a is horizontal and intersects with a first one of the optical systems 112a that is closest to the segmented dish 102. Each of the panels 104b-104g extends from its respective smaller base, coupled to a respective outer edge of the first panel 104a, radially outward from the first panel 104a and forward in a direction aligned with the axis 118 toward the rotatable platform 110, to its respective longer base. In some implementations, the panels 104b-104g extend forward at an angle of about 30 degrees, or between 20 and 40 degrees, or between 10 and 50 degrees, with respect to the first panel 104a, such that the segmented dish forms a truncated hexagonal pyramid with an angle between opposing sides of about 120 degrees, or between 100 and 140 degrees, or between 80 and 160 degrees. A resulting front edge of the segmented dish 102 is hexagonal and formed by the longer bases of the panels 104b-104g.

Figure 6:
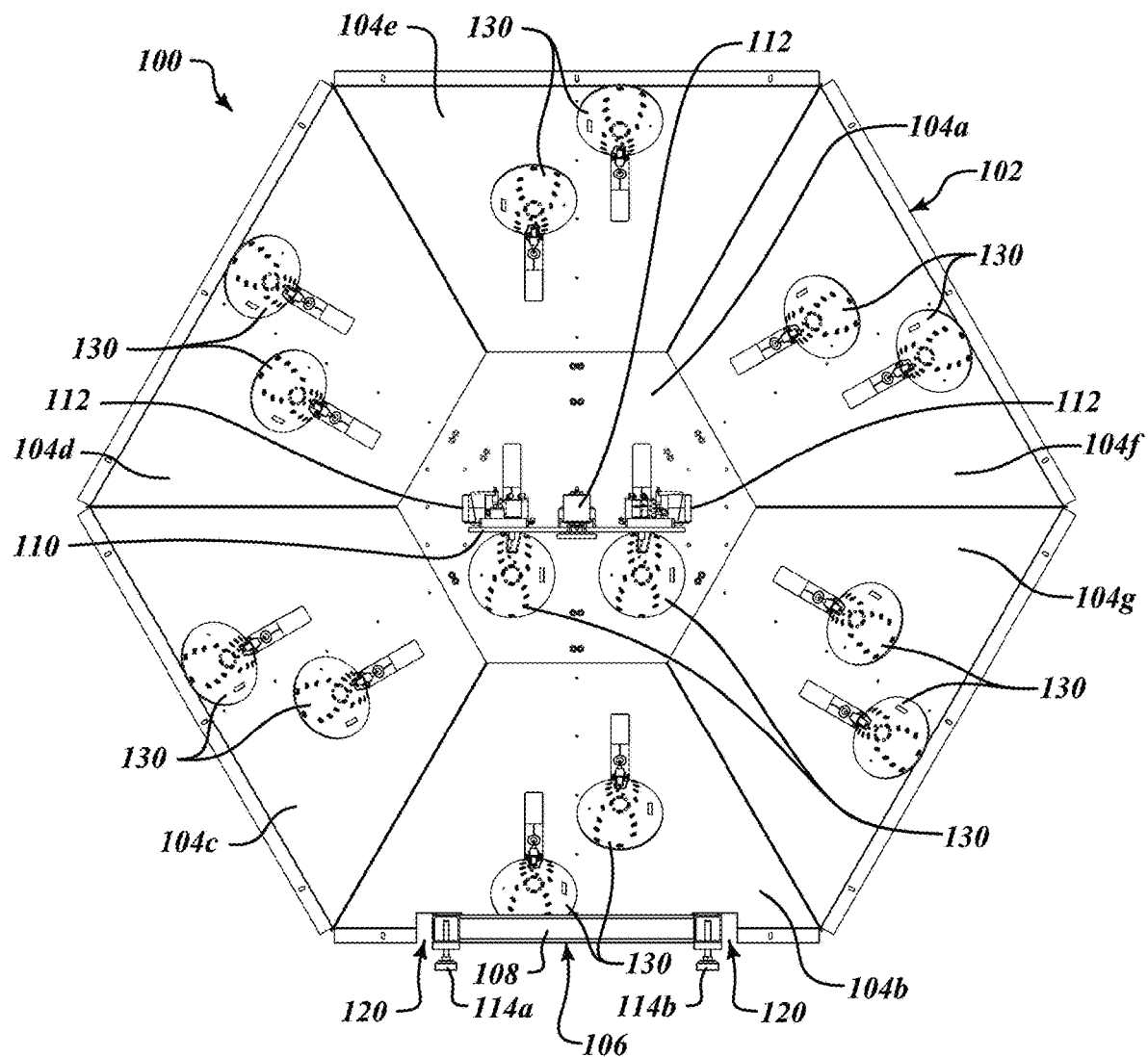
FIG. 6 is a front view of the calibration system of FIGS. 2-5, according to at least one illustrated implementation.

The segmented dish 102 therefore has an overall concave dish shape when viewed from the rotatable platform 110 and optical systems 112, and covers a field of view of the optical system 112a. As illustrated in FIG. 6, the overall shape of the segmented dish 102 has 6-degree rotational symmetry about the axis 118. The segmented dish 102 has a pair of notches 120 cut out of its bottom edge (i.e., cut out of the bottom edge of the second panel 104b) to allow respective shafts 108 of the support frame 106 to pass through the notches 120 from in front of the segmented dish 102 to behind the segmented dish 102.

The first optical system 112a, which is to be calibrated by the calibration system 100, is located at a focus or focal point of the segmented dish 102. As used herein, this means that each of an axis extending through and perpendicular to the first panel 104a, an axis extending through and perpendicular to the second panel 104b, an axis extending through and perpendicular to the third panel 104c, an axis extending through and perpendicular to the fourth panel 104d, an axis extending through and perpendicular to the fifth panel 104e, an axis extending through and perpendicular to the sixth panel 104f, and an axis extending through and perpendicular to the seventh panel 104g intersect with the optical system 112a.

In some implementations, an axis extending through a location at or proximate a center of, and perpendicular to, the first panel 104a, an axis extending through a location at or proximate a center of, and perpendicular to, the second panel 104b, an axis extending through a location at or proximate a center of, and perpendicular to, the third panel 104c, an axis extending through a location at or proximate a center of, and perpendicular to, the fourth panel 104d, an axis extending through a location at or proximate a center of, and perpendicular to, the fifth panel 104e, an axis extending through a location at or proximate a center of, and perpendicular to, the sixth panel 104f, and/or an axis extending through a location at or proximate a center of, and perpendicular to, the seventh panel 104g intersect with the optical system 112a.

Figure 7:
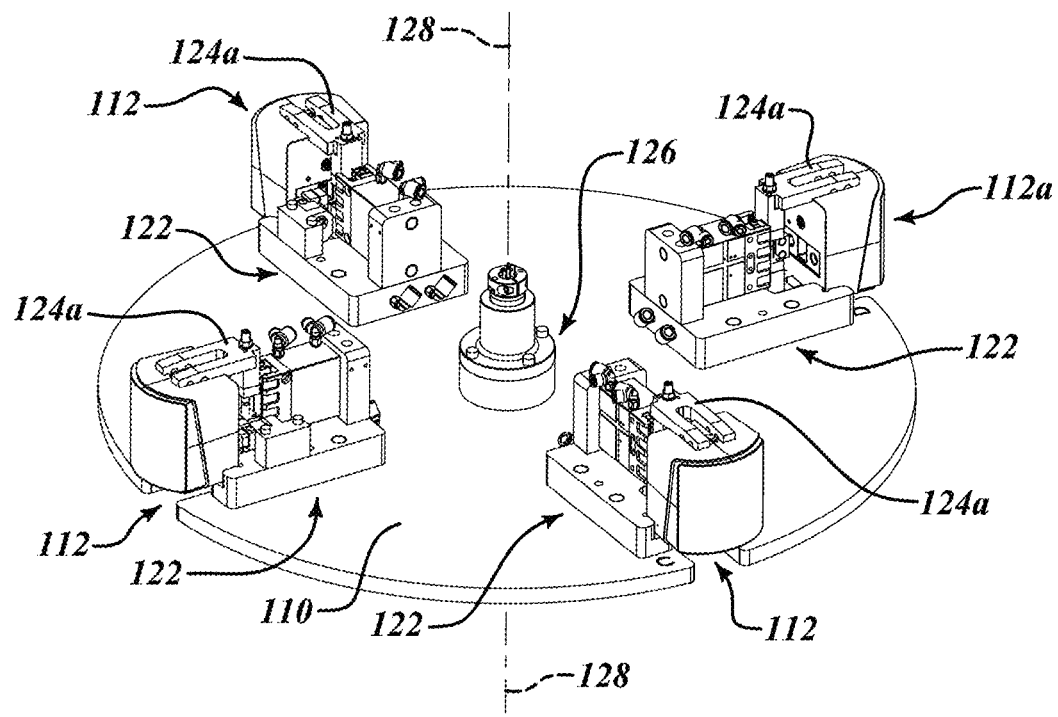
FIG. 7 is a close-up top perspective view of several optical systems to be calibrated by the calibration system of FIGS. 2-6, according to at least one illustrated implementation.
Figure 8:
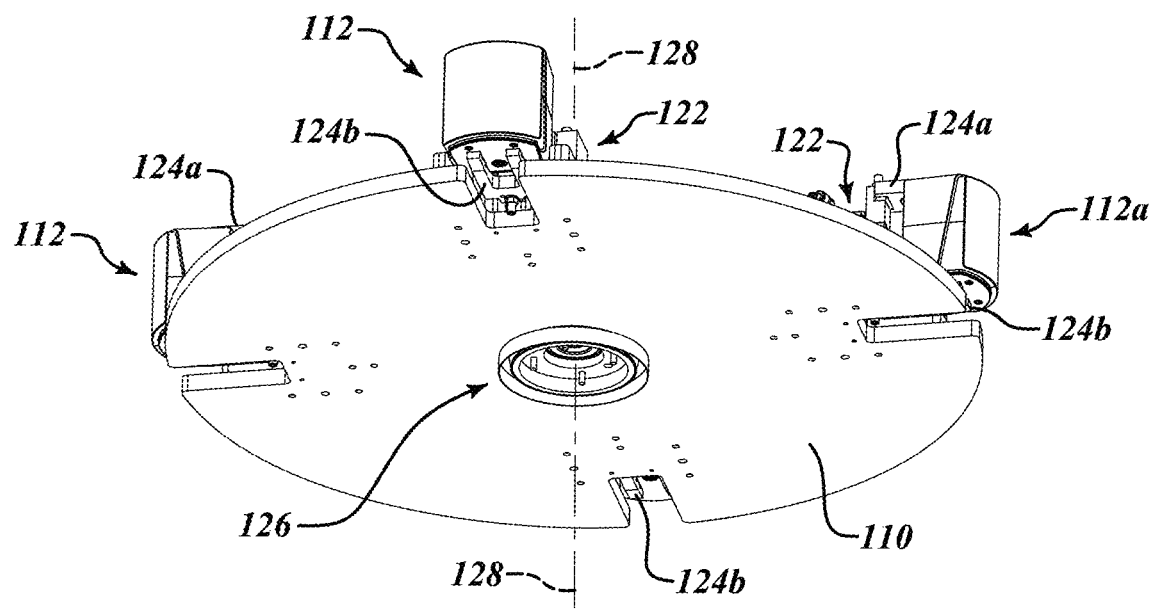
FIG. 8 is a close-up bottom perspective view of several optical systems to be calibrated by the calibration system of FIGS. 2-6, according to at least one illustrated implementation.

FIGS. 7 and 8 illustrate close-up perspective views of the rotatable platform 110 and the optical systems 112 supported thereon, from above and below the platform 110, respectively. As illustrated in FIGS. 7 and 8, the platform 110 includes four pedestals 122, each configured to support and hold a respective one of the optical systems 112. In particular, each of the pedestals 122 includes respective upper arms 124a and respective lower arms 124b, which can be actuated to move toward one another to grasp and hold the respective optical system 112 on the respective pedestal 122 and on the rotatable platform 110. Each of the pedestals 122 includes electronic and mechanical components to control and power actuation of the arms 124a, 124b, and in some implementations each of the pedestals 122 also includes electrical components to control and power actuation and operation of the respective optical system 112.

In some implementations, the platform 110 is a part of a larger system that carries optical systems 112 toward and away from the platform 110. For example, the optical system 112a can be carried to the platform 110 and positioned on one of the pedestals 122, such as the pedestal 122 located farthest from the segmented dish 102, by the larger system. The arms 124a, 124b can be actuated to grasp the optical system 112a and hold it in place with respect to the platform 110. The platform 110 can then be actuated to rotate about its own central longitudinal axis 128, such as on a bearing 126, to carry the optical system 112a to the position illustrated in FIG. 2 (i.e., closest to the segmented dish 102), where it can be tested and calibrated using the calibration system 100.

Thereafter, the platform 110 can be actuated to rotate about its own central longitudinal axis 128, such as on the bearing 126, to carry the optical system 112a to the position farthest from the segmented dish 102. The arms 124a, 124b can be actuated to release the optical system 112a, and the larger system can carry the optical system 112a away from the platform 110. The larger system can then carry another optical system 112 to the platform 110 and position the optical system 112 on the emptied pedestal 122, to repeat the testing and calibration process.

The platform 110 can carry four different optical systems 112 at a time. Thus, the unloading and re-loading of optical systems from a first one of the pedestals 122 can take place as another optical system 112 positioned on a second one of the pedestals opposite to the first is tested or calibrated using the calibration system 100. Nevertheless, unloading and re-loading of optical systems from the pedestals 122 may not occur while another optical system 112 is tested or calibrated, to minimize potential interference of any resulting movements or vibrations caused by the unloading or re-loading process. Throughout the remainder of this disclosure, reference to the optical system 112a means the optical system 112 that is positioned closest to the segmented dish 102 for testing or calibration by the calibration system 100.

Figure 2:
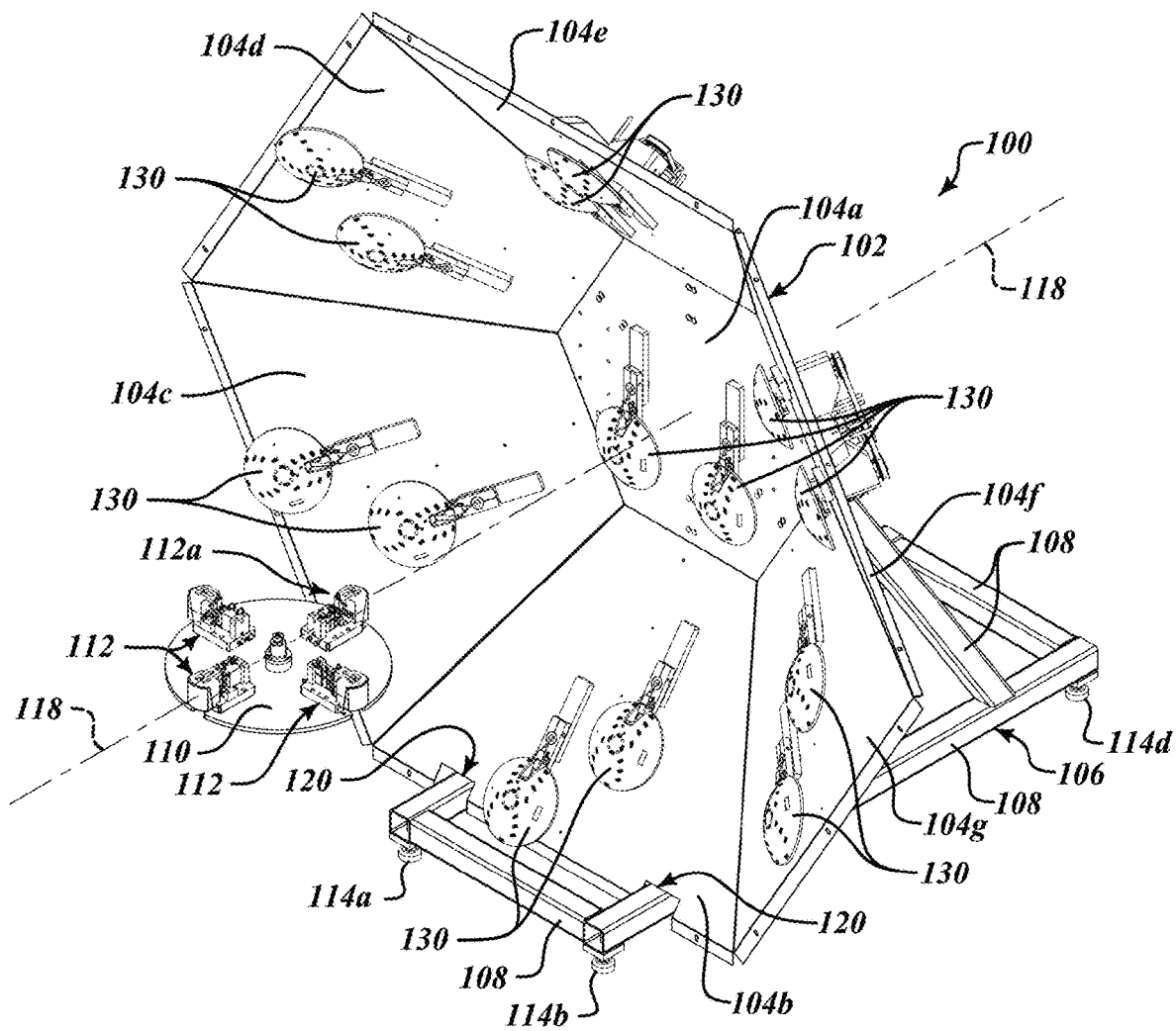
FIG. 2 is a front, top, right-side perspective view of a calibration system, according to at least one illustrated implementation.
Figure 3:
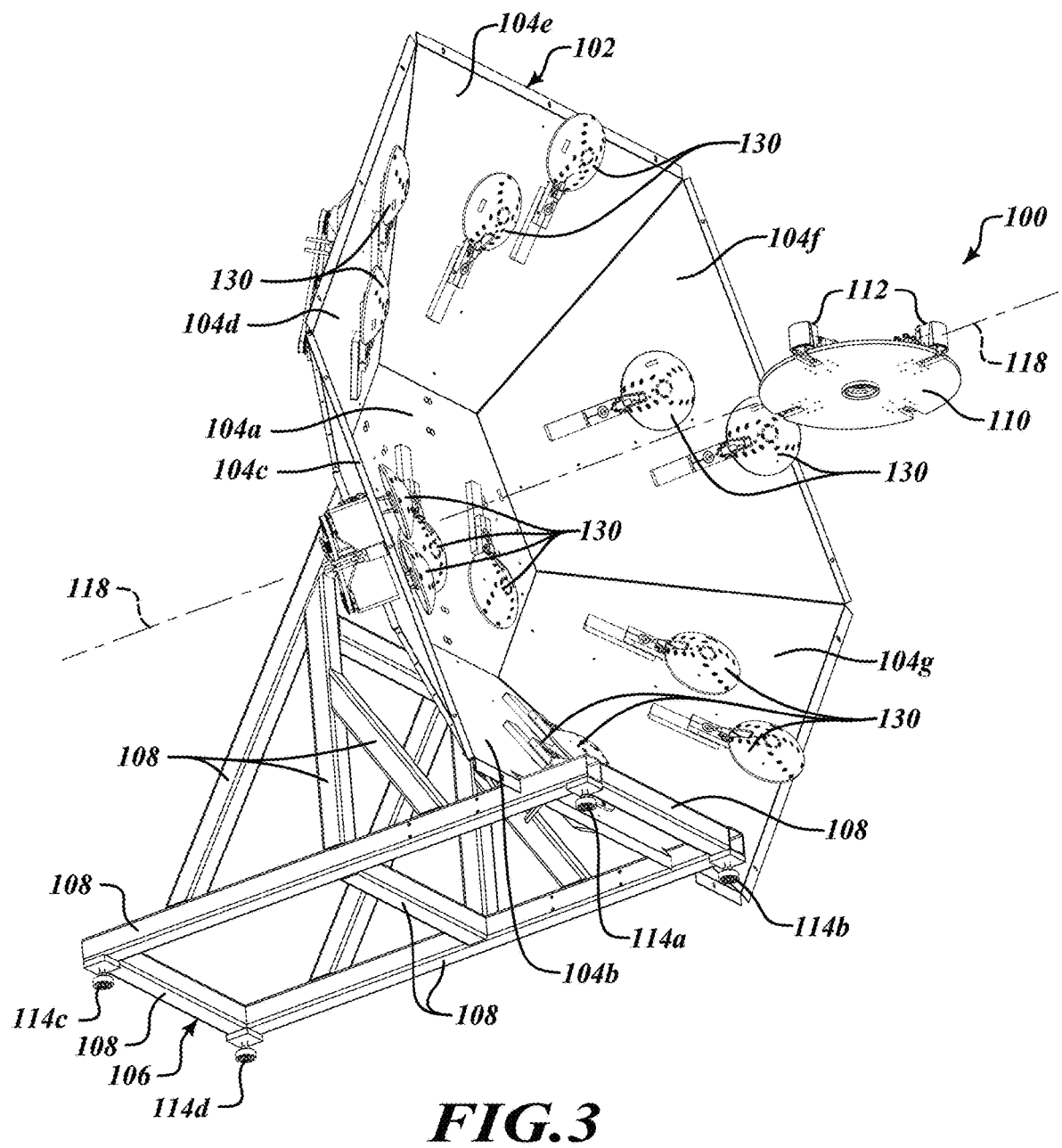
FIG. 3 is a front, bottom, left-side perspective view of the calibration system of FIG. 2, according to at least one illustrated implementation.

FIGS. 2, 3, and 6 illustrate that each of the seven individual panels 104a-104g includes a pair of sensor assemblies 130 coupled to a front, forward-facing major surface thereof. In particular, each of the sensor assemblies 130 is rotatably coupled to the forward-facing major surface of the respective panel 104. Each of the sensor assemblies 130 is centrally located within the forward-facing major surface of the respective panel 104. In some implementations, a midpoint between the axes of rotation (discussed further below) of two sensor assemblies coupled to a single panel 104 is located at the geometric center of the single panel 104.

Figure 9:
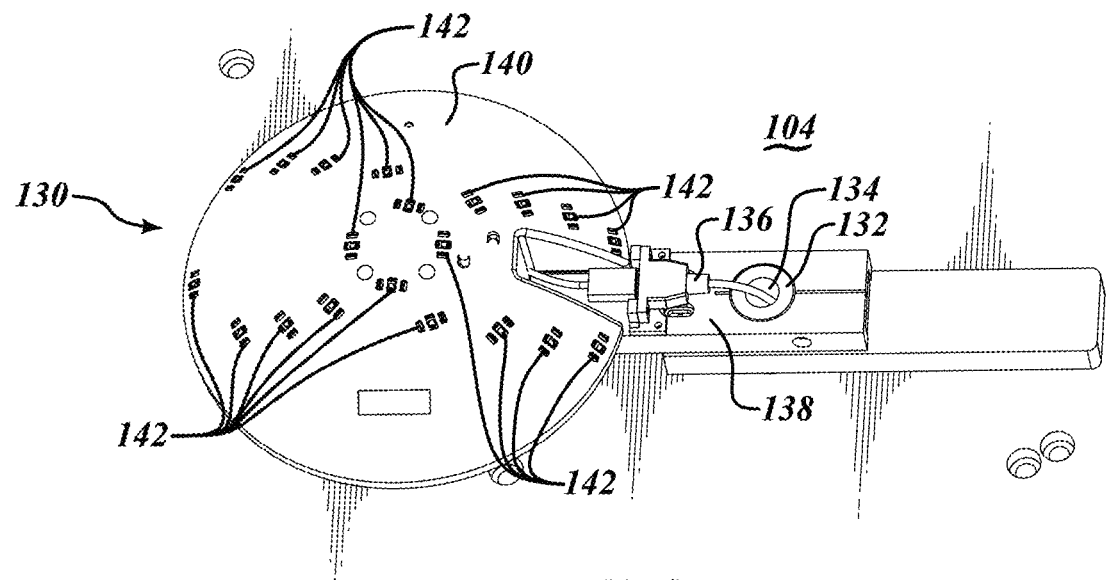
FIG. 9 is a close-up perspective view of a sensor assembly of the calibration system of FIGS. 2-6, according to at least one illustrated implementation.
Figure 10:
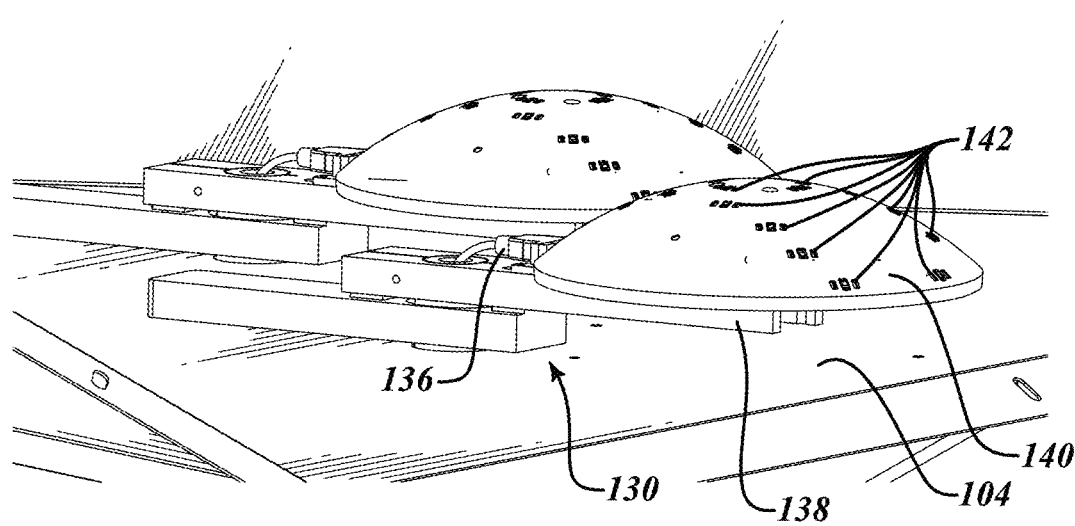
FIG. 10 is another close-up perspective view of a sensor assembly of the calibration system of FIGS. 2-6, according to at least one illustrated implementation.

FIGS. 9 and 10 illustrate close-up perspective views of one of the sensor assemblies 130, which is similar or identical each of the other sensor assemblies 130. As illustrated in FIGS. 9 and 10, the sensor assembly 130 includes a central hub 132, which is rotatably mounted to one of the panels 104 and rotatably couples the rest of the sensor assembly 130 to the panel 104. The central hub 132 has an opening 134 that extends through its center to allow wires 136, cables, or other features or components of the sensor assembly 130 to extend through the central hub 132 and through the panel 104 from in front of the panel 104 to behind the panel 104 along an axis of rotation of the sensor assembly 130.

The sensor assembly 130 also includes an arm 138 that extends radially outward from the central hub 132 and a head portion 140 having an overall shape comprising a dome or a portion of a sphere that extends forward from the arm 138. The head portion 140 includes a plurality of (e.g., twenty) photodetectors 142 facing forward from the dome-shaped outer surface of the head portion 140. When the sensor assembly 130 is actuated to rotate about its axis of rotation at the center of its central hub 132, its head portion 140, and each of its photodetectors 142, travel along a circular path about the axis of rotation.

In at least some implementations, the photodetectors 142 are arranged on the surface of the head portion 140 such that no two photodetectors 132 are aligned with one another along a radial axis extending radially outward from the axis of rotation of the sensor assembly 130. The photodetectors 142 may also be arranged so that they are spaced apart from one another, such as uniformly spaced apart from one another, in a radial direction from the axis of rotation, which allows each of the photodetectors 142 to sweep out a different circular path as it rotates about the axis of rotation at the center of the central hub 132. Further, the photodetectors 142 are arranged on the dome shape of the head portion 140 such that no two photodetectors 142 sweep out circular paths within the same geometric plane, and so that there is a clear line of sight from the optical system 112a to each of the photodetectors 142 throughout the entirety of their respective circular paths. Such features improve the overall performance of the calibration system 100.

Figure 11:
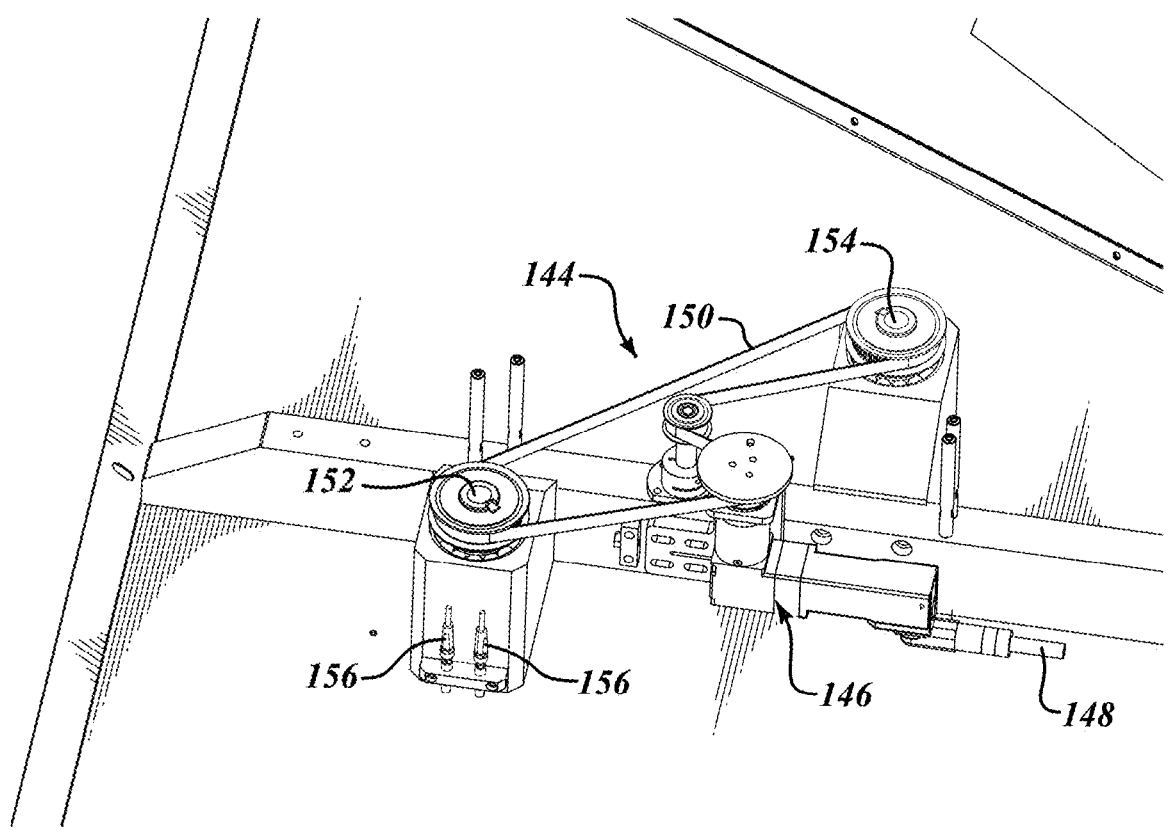
FIG. 11 is a close up perspective view of a motor assembly of the calibration system of FIGS. 2-6, according to at least one illustrated implementation.

FIGS. 4 and 5 illustrate that each of the seven individual panels 104a-104g includes a motor assembly 144 coupled to a rear and rearward-facing major surface thereof. Each of the motor assemblies 144 is centrally located within the rearward-facing major surface of the respective panel 104, at a location opposite the sensor assemblies 130 coupled to the forward-facing major surface of the same respective panel 104. FIG. 11 illustrates a close-up perspective view of one of the motor assemblies 144, which is similar or identical each of the other motor assemblies 144.

As illustrated in FIG. 11, the motor assembly 144 includes an electrically-powered motor 146 having a wire or set of wires 148 that allow an operator to power and control operation of the motor 146. As also illustrated in FIG. 11, the motor assembly 144 includes a belt 150 that rotationally locks an output shaft of the motor 146 to a first input shaft 152 coupled to a first one of the sensor assemblies 130 coupled to the front face of the panel 104 and that rotationally locks the output shaft of the motor 146 to a second input shaft 154 coupled to a second one of the sensor assemblies 130 coupled to the front face of the panel 104. The motor 146 can be actuated to turn both of the first and second input shafts 152, 154, and the sensor assemblies 130 coupled thereto, either in a clockwise direction or in a counter-clockwise direction, as viewed from the front of the calibration system 100.

The sensor assemblies 130 are mechanically coupled to the input shafts 152, 154 by their respective hubs 132. Due to the relatively tight tolerances in commercially available rotational bearings, it is relatively straightforward, using off-the-shelf components, to fabricate the calibration system 100 so that the circular paths of the photodetectors 142 of the sensor assemblies 130 are highly precise. Specifically, in at least some implementations the calibration system 100 is fabricated so that the circular paths of the photodetectors 142 of the sensor assemblies 130 are sufficiently precise to detect deviations in the light emitted by the optical system 112a from the predetermined pattern to within an accuracy of, or better than, 0.1 mm at a distance of one meter away from the optical system 112a.

As also illustrated in FIG. 11, the motor assembly 144 includes wires or sets of wires 156 that allow an operator to receive signals and data regarding measurements from the photodetectors 142. In some implementations, the wires 148 and 156, as well as the electronic components of the pedestals 122, are coupled to an electronic control and/or data acquisition system, which can be used by a human operator to control operation of, and collect measurements from, various components of the calibration system 100, including the motors 146, the sensor assemblies 130, and/or the pedestals 122 (and thereby, the optical systems 112).

The optical system 112a is designed and configured to emit light, such as infrared light, according to a predetermined pattern, including various pulses and sweeps of the infrared light across its field of view. For example, the optical system 112a includes a plurality of infrared light emitting diodes (LEDs) and a plurality of infrared laser systems, as well as a plurality of adjustable mirrors and a plurality of adjustable lenses to direct the light across the field of view of the optical system 112a.

The optical system 112a can be used in a virtual or augmented reality system by emitting such light according to the predetermined pattern and thereby allowing a head mounted display unit of the virtual or augmented reality system to determine its position and/or orientation within its environment using photodetectors to detect the emitted light. In order for the optical system 112a to be used in such implementations, it is desirable for the light emitted by the optical system 112a to conform to the predetermined pattern to within an accuracy of, or better than, 0.10 mm at a distance of one meter away from the optical system 112a, for example.

Given that the manufacturing tolerances for the optical system 112a are non-zero, however (i.e., the actual geometry of the optical system 112a, including the positions and orientations of the LEDs, laser systems, mirrors, and lenses, differs from the specified geometry of the optical system 112a), overall performance of the virtual or augmented reality system can be improved by measuring, testing, analyzing, and/or calibrating the optical system 112a prior to shipment to an end-user.

Figure 12:
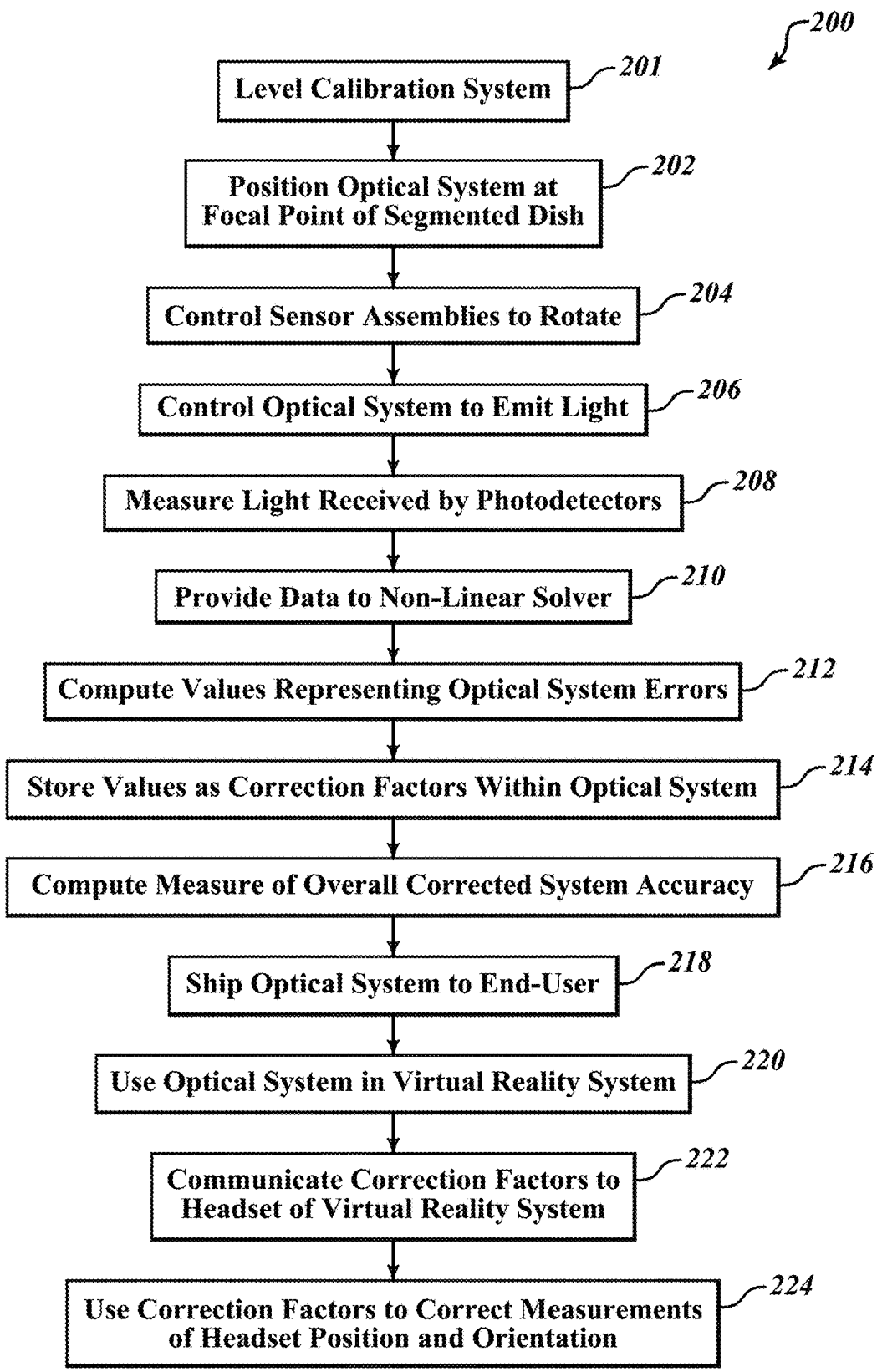
FIG. 12 is a flow chart diagram of a method of using the calibration system of FIGS. 2-6 to calibrate an optical system, according to at least one illustrated implementation.

In particular, as illustrated in FIG. 12, a method 200 of using the calibration system 100 to calibrate the optical system 112a includes screwing the feet 114 into or out of respective shafts 108 to level the calibration system 100, such as in the manner described above, at 201, positioning the optical system 112a at a focal point of the segmented dish 102, such as in the manner described above, at 202, controlling each of the sensor assemblies 130 to rotate about its respective axis of rotation, such as in the manner described above, at 204, controlling the optical system 112a to emit light according to the predetermined pattern, at 206, and measuring the light emitted by the optical system 112a and received by each of the photodetectors 142 as they rotate, at 208.

Controlling the optical system 112a to emit light according to the predetermined pattern may take only a few (e.g., between two and five or between three and four) seconds, and the photodetectors take measurements of the light they receive at a rate of between 50 and 100 Hz, or between 60 and 80 Hz, such that the total number of measurements taken by the calibration system 100 over the course of the emission of the light according to the predetermined pattern is about 60,000. Once these measurements have been taken and recorded, they are fed into or provided to a non-linear solver, along with the specified geometry of the optical system, the predetermined pattern for the emitted light, and a constraint that each of the individual photodetectors 142 moved along a perfect circular path in three-dimensional space, at 210. Geometric data identifying the location of each of the photodetectors 142 could also be fed into or provided to the non-linear solver, but is not needed for the performance of the non-linear solver.

Due to the arrangement of the photodetectors 142 within each of the sensor assemblies 130, the photodetectors 142 capture many data samples along circular paths that are adjacent to each other, which produces data in the form of a plurality of concentric circles. Using such input information, the non-linear solver then computes and outputs numerical values representative of errors in the actual geometry of the optical system 112a or the deviation of the actual geometry of the optical system 112a from its specified geometry, at 212. As examples, the non-linear solver can output numerical values representative of deviations in the shape and orientation of a spreader lens, in the shape and orientation of an optical sheet, in the speed of a rotor, or in the dynamic behavior of one or more components of the optical system 112a. The numerical values are then stored or used as correction or calibration factors within the optical system 112a, at 214, a measure of overall system accuracy when using the correction factors is computed, at 216, and the optical system 112a is then shipped to an end-user for use in a virtual or augmented reality system, at 218.

Once the end-user begins using the optical system 112a in a virtual or augmented reality system, at 220, the optical system 112a communicates the correction factors to a headset of the virtual or augmented reality system, at 222, and the headset uses the correction factors to correct its measurements of its position and orientation within its environment, based on its detection of the light emitted from the optical system 112a, at 224.

Figure 13:
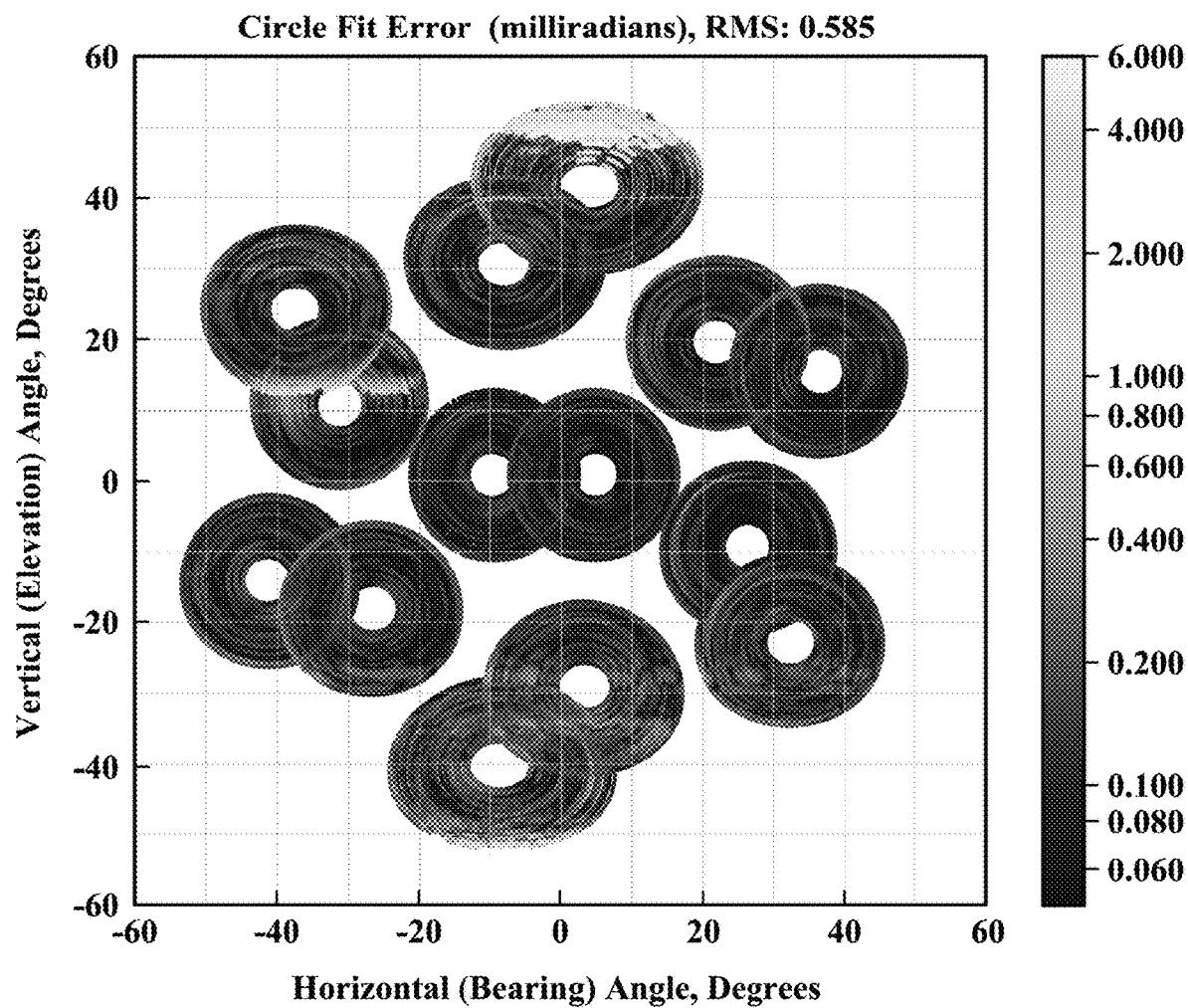
FIG. 13 is a chart that plots the results of a method of using the calibration system of FIGS. 2-6, according to at least one illustrated implementation.

FIG. 13 illustrates results provided by the calibration system 100. In particular, FIG. 13 illustrates each of the measurements taken by each of the photodetectors 142 during a method such as method 200, with shading at the location of each measurement illustrating calculated error for the measurement taken at that location. The results illustrated in FIG. 13 show that each of the photodetectors 142 traces a circular path, and that together, the photodetectors 142 cover a large portion of the overall field of view. The shading illustrated in FIG. 13 therefore provides a detailed map of tracking quality across the overall field of view of an optical system.

While the calibration system 100 has been described as being used to calibrate an optical system 112a for use within a virtual or augmented reality system, the calibration system 100 could be used to calibrate an optical system 112a, an acoustic (e.g., ultrasound) tracking system, or any other suitable system for use within a three-dimensional tracking system. For example, the calibration system 100 can be modified to include acoustic detectors in place of the photodetectors 142 to be used to calibrate an acoustic emitter in place of the optical system 112a.

Further, while the calibration system 100 has been described as being used to calibrate a light-emitting optical system 112a by using photodetectors moving along circular paths to detect the emitted light, the principles described above for the calibration system 100 could be used to calibrate a light-detecting optical system such as a photodetector, a camera, etc., by using light-emitting devices such as LEDs moving along circular paths. Similarly, the principles described above for the calibration system 100 could be used to calibrate an acoustic detector rather than an acoustic emitter, by using acoustic emitters moving along circular paths.

The various implementations described above can be combined to provide further implementations. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

What is claimed is:

1. A calibration system, comprising:
    a stationary support element; and
    a sensor assembly rotatably coupled to the stationary support element, the sensor assembly includes a plurality of photodetectors that are each constrained to rotate about an axis of rotation of the sensor assembly,
    wherein, in operation, the calibration system is operative to:
        rotate the sensor assembly along the axis of rotation of the sensor assembly;
        cause an optical system to emit light during rotation of the sensor assembly;
        record measurements of the emitted light captured by each of the plurality of photodetectors; and
        calculate at least one calibration factor for the optical system based on the recorded measurements, wherein the calculation of the at least one calibration factor is subject to a constraint that each of the plurality of photodetectors moved along a circular path during rotation of the sensor assembly along the axis of rotation of the sensor assembly, wherein the at least one calibration factor is representative of a manufacturing imperfection of the optical system, and the at least one calibration factor is usable by a virtual reality system to correct measurements of the location of a component of the virtual reality system.

2. The calibration system of claim 1 wherein the sensor assembly includes a dome-shaped outer surface and each of the photodetectors is positioned within the dome-shaped outer surface of the sensor assembly.

3. The calibration system of claim 1 wherein each of the photodetectors is arranged on the sensor assembly such that no two of the photodetectors are aligned with one another along a radial axis extending radially outward from the axis of rotation.

4. The calibration system of claim 1 wherein each of the photodetectors is arranged on the sensor assembly such that the photodetectors are radially spaced apart from one another with respect to the axis of rotation.

5. The calibration system of claim 1 wherein each of the photodetectors is arranged on the sensor assembly such that the photodetectors are uniformly radially spaced apart from one another with respect to the axis of rotation.

6. The calibration system of claim 1 wherein each of the photodetectors is arranged on the sensor assembly such that no two of the photodetectors sweep out circular paths within a single geometric plane.

7. The calibration system of claim 1 wherein each of the photodetectors is arranged on the sensor assembly such that a clear line of sight exists from a location of an optical system to be calibrated by the calibration system to each of the photodetectors along an entirety of a path of each of the photodetectors.

8. The calibration system of claim 1 wherein the plurality of photodetectors includes at least 20 photodetectors.

9. The calibration system of claim 1 wherein the at least one calibration factor is representative of a manufacturing imperfection of the optical system that is related at least one of: a shape and orientation of a spreader lens of the optical system; a shape and orientation of an optical sheet of the optical system; a speed of a rotor of the optical system; or a dynamic behavior of one or more components of the optical system.

10. A calibration system, comprising:
    a stationary support structure; and
    a plurality of sensor assemblies including a first sensor assembly rotatably coupled to the support structure and a second sensor assembly rotatably coupled to the support structure, the first sensor assembly includes a first plurality of photodetectors constrained to rotate about a first axis of rotation of the first sensor assembly, the second sensor assembly includes a second plurality of photodetectors constrained to rotate about a second axis of rotation of the second sensor assembly
    wherein, in operation, the calibration system is operative to:
        rotate the first sensor assembly about the first axis of rotation;
        rotate the second sensor assembly about the second axis of rotation;
        cause an optical system to emit light during rotation of the first and second sensor assemblies;
        record measurements of the emitted light captured by each of the first and second plurality of photodetectors; and
    calculate at least one calibration factor for the optical system based on the recorded measurements, wherein the calculation of the at least one calibration factor is subject to a constraint that each of the first and second plurality of photodetectors moved along a circular path, wherein the at least one calibration factor is representative of a manufacturing imperfection of the optical system, and the at least one calibration factor is usable by a virtual reality system to correct measurements of the location of a component of the virtual reality system.

11. The calibration system of claim 10 wherein the support structure includes:
    a first panel located at a center of a segmented dish and having a hexagonal shape including a first edge, a second edge, a third edge, a fourth edge, a fifth edge, and a sixth edge;
    a second panel having a trapezoidal shape including a smaller base coupled to the first edge of the first panel;
    a third panel having a trapezoidal shape including a smaller base coupled to the second edge of the first panel and a first leg coupled to a first leg of the second panel;
    a fourth panel having a trapezoidal shape including a smaller base coupled to the third edge of the first panel and a first leg coupled to a second leg of the third panel;
    a fifth panel having a trapezoidal shape including a smaller base coupled to the fourth edge of the first panel and a first leg coupled to a second leg of the fourth panel;
    a sixth panel having a trapezoidal shape including a smaller base coupled to the fifth edge of the first panel and a first leg coupled to a second leg of the fifth panel; and a seventh panel having a trapezoidal shape including a smaller base coupled to the sixth edge of the first panel, a first leg coupled to a second leg of the sixth panel, and a second leg coupled to a second leg of the second panel.

12. The calibration system of claim 11 wherein the plurality of sensor assemblies includes two sensor assemblies rotatably coupled to each of a plurality of the panels of the support structure.

13. The calibration system of claim 12 wherein each of the two sensor assemblies rotatably coupled to each of the plurality of panels includes twenty photodetectors constrained to rotate about an axis of rotation of the respective sensor assembly.

14. The calibration system of claim 10, further comprising:
a first motor assembly coupled to the first sensor assembly to actuate the first sensor assembly to rotate about the first axis of rotation; and
a second motor assembly coupled to the second sensor assembly to actuate the second sensor assembly to rotate about the second axis of rotation.

15. The calibration system of claim 10 wherein the at least one calibration factor is representative of a manufacturing imperfection of the optical system that is related at least one of: a shape and orientation of a spreader lens of the optical system; a shape and orientation of an optical sheet of the optical system; a speed of a rotor of the optical system; or a dynamic behavior of one or more components of the optical system.

16. A method of calibrating an optical system, comprising:
moving a first photodetector coupled to a stationary support element along at least a portion of a first circular path;
moving a second photodetector coupled to the stationary support element along at least a portion of a second circular path;
generating light at the optical system;
recording measurements of the generated light taken by the first and second photodetectors; and
calculating at least one calibration factor for the optical system based on the recorded measurements, wherein the calculation of the at least one calibration factor is subject to a constraint that the first and second photodetectors moved along circular paths, wherein the at least one calibration factor is representative of a manufacturing imperfection of the optical system, and the at least one calibration factor is usable by a virtual reality system to correct measurements of the location of a component of the virtual reality system.

17. The method of claim 16 wherein calculating the at least one calibration factor for the optical system includes providing the recorded measurements a specified geometry of the optical system to a non-linear solver.

18. The method of claim 16 wherein calculating the at least one calibration factor for the optical system includes providing the recorded measurements a specified pattern of the generated light to a non-linear solver.

19. The method of claim 16 wherein calculating the at least one calibration factor for the optical system includes providing the recorded measurements and the constraint that the first and second photodetectors moved along circular paths to a non-linear solver.

20. A method of calibrating an optical system, comprising:
positioning the optical system at a focal point of a segmented dish formed of a plurality of panels;
moving a first photodetector coupled to a first one of the panels along at least a portion of a first circular path;
moving a second photodetector coupled to a second one of the panels along at least a portion of a second circular path;
generating light at the optical system;
recording measurements of the generated light taken by the first and second photodetectors; and
using the recorded measurements to calculate at least one calibration factor for the optical system, wherein the calculation of the at least one calibration factor is subject to a constraint that each of the first and second of photodetectors moved along a circular path, wherein the at least one calibration factor is representative of a manufacturing imperfection of the optical system.

21. The method of claim 20, further comprising:
using the optical system in a virtual reality system;
communicating the at least one calibration factor to a component of the virtual reality system; and
using the calibration factor to correct measurements of the location of the component.

22. The method of claim 21 wherein the component is a headset.

23. The method of claim 21 wherein the component is a controller.

* * * * *